(12) United States Patent
Busch et al.

(10) Patent No.: US 8,346,702 B2
(45) Date of Patent: Jan. 1, 2013

(54) SYSTEM AND METHOD FOR AUTOMATICALLY PREDICTING THE OUTCOME OF EXPERT FORECASTS

(75) Inventors: Justin Busch, Tustin, CA (US); Ryan Brunton, San Diego, CA (US)

(73) Assignee: Step 3 Systems, Inc., Tustin, CA (US)

( * ) Notice: Subject to any disclaimer, the term of this patent is extended or adjusted under 35 U.S.C. 154(b) by 704 days.

(21) Appl. No.: 12/471,164

(22) Filed: May 22, 2009

(65) Prior Publication Data

US 2010/0299301 A1  Nov. 25, 2010

(51) Int. Cl.
*G06N 5/02* (2006.01)
(52) U.S. Cl. ............... 706/46; 707/602; 707/811; 704/9
(58) Field of Classification Search .................... 706/45, 706/46; 707/602, 811; 704/9
See application file for complete search history.

(56) References Cited

OTHER PUBLICATIONS

Luo et al ("A Multi-Agent Decision Support System for Stock Trading" 2002).*
Leung et al ("Using investment portfolio return to combine forecasts: A multiobjective approach" 2000).*
Seth Grimes (Text Analytics Basics, Part 1 Jul. 2008.*
Sycara et al (Intelligent Agents in Portfolio Management 1996).*
Tseng et al ("Real-time decision support and information gathering system for financial domain" 2005).*
Seth Grimes ("Sentiment Analysis: Opportunities and Challenges" Jan. 2008).*
Cover, Thomas M. Universal Portfolios, Mathematical Finance, vol. 1, No. 1 (Jan. 1991), pp. 1-29.
Chou, Seng-Cho T. et al. A stock selection DSS combining AI and technical analysis, Annals of Operations Research 75 (1997), pp. 335-353.
Cooper, Rick A. et al. Following the leader: a study of individual analysts' earnings forecasts, Journal of Financial Economics 61 (2001), pp. 383-416.
Wiebe, Janyce et al., Annotating Expressions of Opinions and Emotions in Language, 2005 Kluwer Academic Publishers, Printed in the Netherlands, wiebeetal.tex; Dec. 5, 2005; 10:41; pp. 1-54.
Breiman, Leo. Bagging Predictors, Technical Report No. 421, Department of Statistics, University of California Berkeley, Sep. 1994, cover page and pp. 1-19.
Breiman, Leo. Bias, Variance, and Arcing Classifiers, Statistics Department, University of California Berkeley, date unknown, 22 pages.
Borodin, Allan et al. Can We Learn to Beat the Best Stock, Journal of Artificial Intelligence Research 21 (2004), submitted Aug. 2003, published May 2004, 579-594.
Klein, Dan et al. Combining Heterogeneous Classifiers for Word-Sense Disambiguation, Computer Science Department, Stanford University, date unknown, 7 pages.

(Continued)

*Primary Examiner* — Lut Wong
(74) *Attorney, Agent, or Firm* — Procopio, Cory, Hargreaves & Savitch LLP (57) ABSTRACT

Systems and methods are provided that predict the accuracy of expert forecasts based on a corpus of prior expert forecasts. Expert forecasts (also referred to as opinions) are analyzed and processed to determine an opinion and related positions expressed by the expert. Each opinion is combined with relevant industry information to create a structured model for the opinion. A plurality of structured models for a given expert are then analyzed along with information related to the actual outcome of prior predictions to create a decision model for the particular expert. A new opinion issued by an expert is then analyzed using the decision model for that expert to predict the accuracy of the new opinion from the expert. Recommended actions in accordance with or against the new expert opinion may then be provided.

18 Claims, 4 Drawing Sheets

OTHER PUBLICATIONS

Leacock, Claudia et al. Corpus-Based Statistical Sense Resolution, Princeton University and Siemens Corporate Research, Inc., date unknown, pp. 260-265.

Cover, Thomas M. et al. Universal Portfolios with Side Information, IEEE Transactions on Information Theory, vol. 42, No. 2, Mar. 1996, pp. 348-363.

Frankel, Richard et al. Determinants of the informativeness of analyst research, Journal of Accounting and Economics 41 (2006), pp. 29-54.

Barber, Brad M. et al. Buys, holds, and sells: The distribution of investment banks' stock ratings and the implications for the profitability of analysts' recommendations, Journal of Accounting and Economics 41 (2006, pp. 87-117.

Doukas, John A. Divergence of opinion and equity returns under different states of earnings expectations, Journal of Financial Markets 9 (006), pp. 310-331.

Mikhail, Michael B. et al. Do security analysts exhibit persistent differences in stock picking ability? Journal of Financial Economics 74 (2004), pp. 67-91.

Potts, Christopher et al. Exclamatives and heightened emotion: Extracting pragmatic generalizations from large corpora, UMass Amherst, Sep. 7, 2008, 29 pages.

Jacob, John et al. Expertise in forecasting performance of security analysts, Journal of Accounting and Economics 28 (1999), pp. 51-82.

Espahbodi, Reza et al. Further evidence on optimism and underreaction in analysts' forecasts, Review of Financial Economics 10 (2001), pp. 1-21.

Chen, Qi et al. Investor learning about analyst predictive ability, Journal of Accounting and Economics 39 (2005), pp. 3-24.

Holsapple, Clyde W. et al. A machine learning method for multi-expert decision support, Annals of Operations Research 75 (1997), pp. 171-188.

Helmbold, David P. et al. On-Line Portfolio Selection Using Multiplicative Updates, Mathematical Finance, 8 (4):325-347, 1998.

Li, Xi. The persistence of relative performance in stock recommendations of sell-side financial analysts, Journal of Accounting and Economics 40 (2005), pp. 129-152.

Friesen et al. Quantifying cognitive biases in analyst earnings forecasts, Journal of Financial Markets 9 (2006), pp. 333-365.

Yu, Hong et al. Towards Answering Opinion Questions: Separating Facts form Opinions and Identifying the Polarity of Opinion Sentences, Department of Computer Science, Columbia University, date unknown, 8 pages.

\* cited by examiner

SYSTEM AND METHOD FOR AUTOMATICALLY PREDICTING THE OUTCOME OF EXPERT FORECASTS

BACKGROUND

1. Field of the Invention

The present invention is generally related to expert forecasting and more particularly related to predicting the accuracy of expert forecasts based on a corpus of prior expert forecasts.

2. Related Art

The conventional disciplines of natural language processing, expert opinion analysis and to some degree portfolio selection are related to the problem of predicting the accuracy of an expert forecast based on a plurality of prior forecasts by the same expert. A summary of these disciplines and the problems associated with their use in predicting the accuracy of expert forecasts is provided below.

Natural Language Processing

Conventional opinion detection from a natural language document is carried out through a multi-pass natural language process that includes (a) statistically analyzing a sentence to separate factual content from opinion content; (b) re-analyzing opinion content as positive/neutral/negative using a second classification process; and (c) additional processing is performed to conform the opinion statement to a template in order to describe the subject and object of the opinion statement, the intensity of the opinion, as well as other application-specific data. Such an approach is necessary when the goal is to recognize opinions in a body of text.

Conventional systems typically use Bayesian classifiers to determine the sense in which a word is used in the body of text. Additionally, techniques for automatically distinguishing between fact and opinion content at the sentence level have been employed. Solutions for detecting polarity have also been used, although these solutions require predetermined sets of words having known polarity against which words in a sentence are compared. While conventional solutions for detecting polarity can determine if a given sentence has positive or negative polarity, they fail to determine whether the positive or negative polarity supported or opposed the ultimate opinion of the expert.

Expert Opinion Analysis

Conventional expert opinion analysis is typically associated with equities trading and is usually applied to cast the opinion in terms of a three or five point scale of recommendations (e.g., buy/sell/hold). Conventional expert opinion analysis is also applied to determine the expert's estimate of a company's earnings for the next quarter to be reported. The ability of the expert is then measured in terms of the error in the forecast relative to the actual reported result, and the degree to which the expert is considered to have delivered useful information is measured in terms of the market impact of the opinion, generally on the day that the opinion was disseminated.

Many problems exist within conventional expert opinion analysis. One such problem is that the analysis often is expressed in the context of the magnitude of error in the opinion relative to the magnitude of error of other experts. Other analysis techniques consider the timing of revisions to forecasts and assume that experts who revise forecasts earlier have a superior ability to discover and analyze information. These types of analysis fail to determine whether or not the expert opinion is accurate relative to the target subject but instead focus on relative comparison to other experts.

Other types of expert opinion analysis rely on the assumption that past performance forecasts future results such that experts with the greatest prior success in forecasting the behavior of a target subject continue to outperform in future recommendations. The converse assumption is also employed for underperformance. This type of analysis is also based on relative comparison and fails to consider the accuracy of an expert opinion relative to the target subject.

Still other types of expert opinion analysis rely on predetermined data to perform the analysis, do not make any predictions about the target subject of the opinion, do not include any temporal considerations regarding the underlying opinion data, rely on the expert to determine the weight of the expert opinion and also ultimately analyze an expert opinion based on factors as they relate to other experts. Conventional expert opinion analysis therefore fails to dynamically consider the most current opinion data from the expert, does not provide actionable information about the target subject, and fails to independently analyze the expert and instead only provides a relative comparison.

Another problem with conventional expert opinion analysis is demonstrated by the convergence/divergence technique. This conventional technique as applied to investments provides that divergence of opinion among experts correlates negatively with investment returns. In contrast, when experts agree with a positive outlook, investment returns are generally negative as equities prove to be overvalued. Similarly, when experts are collectively negative, returns tend to be positive. This technique suffers from the inability to analyze a single expert opinion because it requires a collective analysis.

Portfolio Selection

Portfolio selection refers to taking action based on an expert opinion analysis. However, the conventional techniques for identifying and analyzing expert opinions discussed above fail to also describe any techniques for taking action based on the substantive content of the opinion.

Some attempts at solutions for portfolio selection have been made as applied to allocation of funds among all possible stocks in a given market. Unfortunately, these attempts suffer from a necessary initial assumption of an equal-weighted starting portfolio where all stocks in the market are continuously held and capital is reallocated daily based on prior performance. A significant drawback of these conventional solutions is that they prevent withdrawing from a poor market, prevent shorting, and they impose substantial real-world trading costs. For example, some solutions require that there must be as many trades each day as there are stocks in the market and the resulting trading costs could easily exceed returns. Other proposed solutions attempt to capture side information, which is defined as information that is available to an investor that is independent of the price vector for each stock and is used as input to adjust and update the portfolio.

Other proposed alternative techniques employ a multiplicative update rule that uses a single tunable learning parameter and a vector-space distance function to control the changes between portfolios from day to day. These typically demonstrate improved returns over prior universal portfolio algorithms, with or without the use of margin borrowing and with or without the use of side information as an input which can improve algorithmic trading results. However, these systems generally behave identically to prior systems, with slightly improved rules used to make trading decisions.

Some of the significant drawbacks of these conventional systems are that to the extent expert opinions are used, these conventional portfolio selection techniques require predetermined data to perform the analysis. The required predetermined data includes a source of machine-readable representations of expert opinions for the various stocks or other instruments in the portfolio. Additionally, these techniques require access to an expert's portfolio allocation weights, which is generally not available for expert opinions. When the expert's portfolio allocation weights are not available, these conventional portfolio selection techniques cannot be used. Another very significant drawback of these conventional solutions is that they fail to allow for contrary actions in a portfolio but instead require the re-allocation of all portfolio funds, even when such a re-allocation would result in a predicted loss.

Some conventional solutions include artificial intelligence and technical analysis of stock prices. These portfolio selection solutions create a two-stage decision system in which a variety of technical analysis formulas commonly used by human traders are used to filter an initial universe of stocks down to a smaller list from which stocks to be bought or sold are determined based on a set of predetermined rules. These solutions fail to include human expert knowledge in the selection process but rather make selections based on historic stock price changes independent of the stock being analyzed by an expert or allocated a relative weight in a portfolio.

Other conventional solutions propose the use of multiple systems including a knowledge database and a set of rules to provide a recommendation and employ techniques for making a single decision from conflicting recommendations from the multiple systems. These solutions use a bidding system whereby the multiple systems conduct an auction to present their recommendations to a human being and that person provides positive or negative feedback regarding prior decisions from the expert. Although these solutions allow the multiple systems to modify the relative weights of their rule sets in response to feedback, they fail to analyze and employ an expert opinion to determine portfolio selection. A particular disadvantage of this approach is that feedback must be given by human beings. This approach also does not determine a best solution, but instead where the multiple systems agree, this approach always recommends inclusion.

Other conventional solutions approach the problem of portfolio selection by introducing technical parameters such as trends in prior stock prices to the selection of a constantly rebalanced portfolio. These solutions attempt to identify correlations between stocks so that when a first stock is correlated to a second stock that has recently increased, funds are reallocated from the second stock to the first stock to capitalize on the expected correlative increase in the first stock. These techniques require correlations to be computed over all pairs of stocks within the universe of available equities, making these approaches highly computationally expensive. Although these types of conventional solutions for portfolio selection have achieved some success, they fail to analyze expert opinions and incorporate those opinions into the portfolio selection process.

Therefore, give the state of the prior art, what is needed is a system and method that overcomes the significant problems found in the conventional systems as described above.

SUMMARY

Accordingly, described herein are computer implemented systems and methods that analyze an electronic body of text to determine an opinion in the body of text, create a structured model of the body of text that includes domain information, combine a plurality of structured models and known outcomes of prior opinions into a decision model for the expert and then use the decision model to analyze an opinion from that expert to predict the outcome of the expert opinion and recommend specific actions based on the predicted outcome.

The present system is implemented on a prediction server that receives source documents that were authored by experts and contain forecasts or opinions about a target subject. The target subject may be related to the financial market, sports, the intelligence industry, or other areas where experts opine on target subjects. The prediction server is communicatively connected to a data communication network so that it can be accessed by users and so it can access source documents stored on computer readable media.

The prediction server uses natural language processing to extract predictions about future events from bodies of text (e.g., a published article). For example, the natural language processing can treat any published article as a potential source of an expert prediction about a target subject. The predictions, which are made by subject matter experts, are compared with previous predictions from the same experts and their corresponding outcomes, and a likelihood that a current prediction is correct is calculated by the prediction server and then the prediction server suggests an action based on a statement of desired outcome.

The prediction system automates the collection and processing of large volumes of natural language expert opinions and combines this data with relevant historical and environmental data about the target subject. The prediction system also provides reliable recommendations for action. Because the prediction system automates the collection of data from unstructured natural-language text, it facilitates the dynamic growth of the underlying set of data used to render predictions, thereby increasing over time the accuracy of the system.

This continuous and dynamic growth allows the prediction system to enter a domain gradually, as expert opinions, known outcomes and related information become available over time. The prediction system also reduces exposure to risk by allowing no action or action contrary to the expert opinion to be the proposed recommendation. In the financial market domain, the prediction system may recommend removal of stocks from a portfolio, shorting of a stock, buying, selling and holding, for example. The prediction system also computes optimal holding periods so as to substantially reduce trading costs, which can be applicable to the financial market domain or the fantasy sports domain. Advantageously, the prediction system also may recommend no action when the alternative choices do not meet a minimum criteria or may recommend action that is opposite to an expert opinion if the analysis conducted by the prediction system so warrants.

In practice, the prediction system makes use of natural language processing to find mentions of companies, sports teams, events, or other subjects about which an opinion is being expressed. In one embodiment, this can be accomplished using named-entity recognition. The prediction system also determines the polarity of any opinion being expressed about the subject in question, for example by applying word-sense disambiguation to each instance of a named entity. One significant advantage is that the prediction system derives a positive or negative position about the target subject by treating names as ambiguous terms that can be analyzed as having a positive or negative meaning about the target subject they reference.

The prediction system also applies word-sense disambiguation to the body of text and the results are used to identify an opinion rather than to distinguish between multiple possible meanings of a word, such as "bank" being used in different contexts to mean either "a financial institution" or "the side of a river."

The prediction system makes a recommendation about an action to be taken based on an analyzed expert opinion. A recommended action can be to make an investment trade, place a wager on a sports game, trade a player in a fantasy sports league, etc. based on the analyzed opinion of an expert. Advantageously, the prediction system adapts to a variety of target subject domains where explicit measurements of success are not readily available, and must be derived from natural language data.

The recommended action may also provide a timeframe for which it is valid (e.g., a recommendation may be valid for a few hours, days, weeks, months or even years). Advantageously, the prediction system determines whether or not an opinion by an expert should be followed, ignored, or rejected and for how long (in real time) based on the past history for the expert in similar contexts and the strength of the expert's current opinion.

The prediction system also overcomes the potential effects of optimism by learning appropriate side information needed to correct for the changing bias. Advantageously, because optimism may have asymmetric trading consequences (losses as a stock falls, but gains or at least neutral performance as it rises), the prediction system accounts for varying market reactions to optimism.

Advantageously, the prediction system learns about an expert's herding tendencies by determining through analysis of structured models those experts that issue the same or very similar opinions as other experts. This information is tracked in a decision model for each expert. The prediction system can therefore automatically find the standout experts without needing to conduct explicit regressions on the group of experts considered to officially cover a given target subject such as a stock or a sports league, for example.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide systems and methods for predicting the accuracy of expert forecasts based on a corpus of prior expert forecasts and presenting recommended actions based on the predicted accuracy. In this description, the terms "forecasts" and "opinions" are used interchangeably. For example, one method as disclosed herein allows for a natural language article expressing a current opinion by an expert about a target subject to be analyzed in the context of a plurality of prior opinions from the same expert about the same or a similar target subject to determine the likelihood of accuracy of the current opinion expressed by the expert. Recommended actions to be taken in accordance with or against the current opinion expressed by the expert are then presented.

After reading this description it will become apparent to one skilled in the art how to implement the invention in various alternative embodiments and apply the invention to various alternative domains. A few alternative domains include the financial market (e.g., stock trading), fantasy sports industry, gaming industry (e.g., sports betting), intelligence industry, politics, and news just to name a few. The invention may also be applied to other domains. This description will focus primarily on the example embodiment of the financial market domain to simplify the disclosure of the invention, however, it should be understood that this example embodiment is presented by way of example only, and not limitation. As such, this detailed description that focuses on the financial market domain embodiment should not be construed to limit the scope or breadth of the present invention as set forth in the appended claims.

Figures 1, 2:
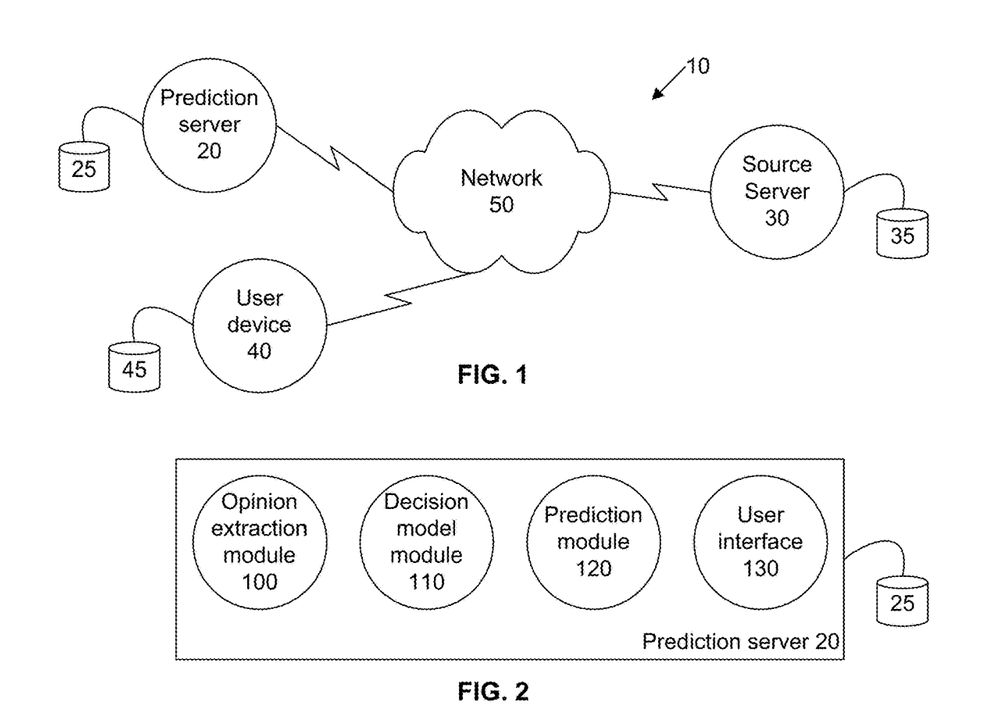
FIG. 1 is a network diagram illustrating an example system for analyzing and predicting the outcome of expert forecasts according to an embodiment of the present invention.
FIG. 2 is a block diagram illustrating an example prediction server according to an embodiment of the present invention.

FIG. 1 is a network diagram illustrating an example system 10 for analyzing and predicting the outcome of expert forecasts according to an embodiment of the present invention. In the illustrated embodiment, the system 10 includes a prediction server 20 that is communicatively coupled with a source server 30 and a user device 40 via a data communication network 50. The prediction server 20, source server 30 and user device 40 each have an associated data storage area 25, 35, and 45, respectively. The data storage area 25 stores computer executable instructions and related information and data for use by the prediction server 20. Although not shown, there can be more than one of the prediction server 20, source server 30, and user device 40 in the system 10.

In operation, the prediction server 20 obtains a body of text that is authored by an expert and processes the body of text to render a prediction about the opinion expressed by the expert in the body of text. For example, the body of text can be a natural language article written by the expert and published in electronic form via a web page. The source server 30 in this example hosts the web page that includes the article. The prediction server 20 may proactively obtain the article by crawling the web pages on the source server 30 to locate the article or passively obtain the article by receiving the article via a data communication channel, user interface or other electronic delivery means. In one embodiment, once a natural language article has been produced by an expert and exists as a body of text, the system 10 obtains the article, for example via web spiders, RSS feeds, subscriptions to e-mail lists, text-to-speech synthesis, etc. Once the article has been obtained, it is further processed to extract an opinion expressed in the article.

Once the article is obtained, the prediction server processes the article to determine the expert who authored the opinion and obtains a decision model for that specific expert from the data storage area 25. If the article is new to the prediction server 20, the article is processed to create a structured model of the article that includes an identification of the expert, the opinion expressed by the expert in the article, and relevant information about the domain and/or target subject about which the opinion is expressed. The opinion expressed in the article is then processed using the decision model to render a prediction about the accuracy of the opinion. The prediction server may also provide a recommendation about a potential action to be taken. For example, if the opinion was about a particular stock, the recommendation could be to buy that stock, sell that stock, or hold that stock.

The source server 30 can be any of a variety of devices that are communicatively coupled with the prediction server 20 via the data network 50. In the example above, the source server 30 was a website. The source server 30 may also be an electronic document repository, a database management system, a paid subscription content provider or any other variety of data storage system that can actively or passively provide bodies of text to the prediction server 20. In one embodiment of the system 10, one or more experts make predictions about expected future events (such as stock or commodity price movements, election results, weather phenomena, intelligence analysis, real or fantasy sports games results, etc.). These predictions may be expressed in natural language through written articles, typically published via newspapers, journals, etc. in electronic or text form. Predictions may also be expressed through oral communications such as television interviews (which may be transferred to natural language text form through a variety of means such as transcripts provided by the broadcaster, closed captioning, or speech recognition). Once an expert opinion exists as a body of text in digital form, it can be stored in a data storage area by one or more source servers 30.

The user device 40 can also be any of a variety of devices that are communicatively coupled with the prediction server 20 via the data network 50. The user device 40 can also be communicatively coupled with the source server 30 via the network 50. The user device 40 can access the prediction server 30 to allow a user to interact with the prediction server 30. A user may provide bodies of text to the prediction server 30 via a user interface or other data communication channel and a display on the user device 40 can be used by the prediction server 30 to present to a user certain information, predictions, recommendations, and other results of the processing of opinions at the prediction server 30. The user device 30 can also be used to facilitate providing a natural language document to the prediction server 20, for example from data storage at the source server 30 or from another location such as the user device 40 or some other data storage location accessible via the network 50.

The network 50 can be any of a variety of physical networks that employ any of a variety of communication protocols. For example, the network 50 can be a wired or wireless network, a personal area network ("PAN"), a local area network ("LAN"), a wide area network ("WAN"), or any combination of these and other types of networks. The network 50 can also be a circuit switched network or a packet switched network and may carry data traffic that conforms to one or more communication protocols. In one embodiment, the network 50 is the Internet and the network 50 conveys data communications between the prediction server 20, the source server 30, and the user device 40.

FIG. 2 is a block diagram illustrating an example prediction server 20 according to an embodiment of the present invention. In the illustrated embodiment, the prediction server 20 comprises an opinion extraction module 100, a decision model module 110, a prediction module 120, and a user interface 130. As previously described, the prediction server 20 is configured with a data storage area 25 for housing the various modules and related information and data.

The opinion extraction module 100 uses word-sense disambiguation to identify and extract an opinion from a body of text. This is accomplished by training a classifier (e.g., a naïve Bayesian classifier, although other classifiers may be used) on a natural language corpus annotated with examples of previous opinions, where each mention of the subject of interest (such as a company, team, player, etc.) is treated as an ambiguous mention of a word which may mean one of the possible outcomes of interest. The classifier uses the context surrounding the word to infer the likely opinion of the expert.

For example, in the sentence "The impressive sales figures should lead IBM stock higher this week." the word "IBM" is determined to be a subject about which an opinion may be expressed. Thus, the word "IBM" is used to both refer to a well-known company and as an expression of an opinion that may mean bullish, bearish or neutral. In this example, the classifier analyzes the words to determine that the expression of the opinion is bullish on IBM because words such as "impressive" and "higher" are more likely to occur in bullish contexts than bearish contexts.

Similarly, in a professional baseball domain, the sentence "The weak Padres hitting is likely to come up short tonight." the word "IBM" is determined to be a subject about which an opinion may be expressed. This reference to "Padres" refers to the professional baseball team and is also used as an expression of an opinion that may mean expected win or expected loss. In this example, the classifier analyzes the words to determine that the expression of the opinion is expected loss because words such as "weak Padres hitting" and "come up short tonight" are more likely to occur in expected loss contexts than expected win contexts.

In many cases, a body of text contains multiple mentions of a subject or multiple subjects that can result in multiple possible opinions. In such cases, when multiple possible opinions are returned by the classifier, a product-of-experts algorithm is used to return a single estimate of the expert opinion. Advantageously, this results in a single opinion being derived from a body of text that may include a plurality of possible opinions. In one embodiment, the product-of-experts algorithm employed is a majority vote, but other algorithms known to those skilled in the art may be used as well.

In addition to extracting the opinion of the expert, the opinion extraction module 100 also extracts one or more position disclosures from the text, if present. A position disclosure is any statement about an expert's potential gains from disclosing an opinion, such as ownership or shorting of a stock which has been positively discussed, or a bet placed on or against a horse predicted to win a race.

Advantageously, position disclosure statements can be found through the use of finite-state transducers that analyze the article text. In one embodiment, a finite-state transducer is a machine that is in a particular state and remains in that state until it receives an input that causes a shift to a different state. For example, a finite-state transducer may analyze a string of text such as "Long Intel, Oracle, and Short Verizon" and iterates through the text until it discovers both a position and the symbol. Thus, when analyzing the string of text for a position on "Verizon," (i.e., a possible subject of the opinion) the position is initially set to "Long" when that word is encountered by the finite-state transducer. The analysis continues until either the subject Verizon or a new position is encountered. In this case, the position would change from "Long" to "Short" when the word "Short" is encountered. The finite-state transducer would then complete its analysis when and terminate when the subject Verizon is encountered. The termination can be said to be because both a position and the desired subject have been encountered or because there are no more words for the finite-state transducer to analyze.

Using the same example string of text, where the possible subject of the opinion is Oracle, the position is initially set to "Long" and then the finite-state transducer terminates the analysis when the word Oracle is encountered. In this fashion, the finite-state transducer does not encounter the word Short because both a position and the desired subject were identified. Alternative and more complicated examples also exist, for example a string of text "Long Oracle puts" would actually change the position statement to a "Short" position. However, while more complicated, these examples conform to the same process of examining a body of text word by word until you reach an end state or run out of words, which is what the finite-state transducer does.

Other information extraction algorithms known to those skilled in the art may also be used to accomplish the identification of position disclosures. In one embodiment, extracting position disclosures in a fantasy sports domain might result in position disclosures that include, e.g., that an expert had chosen a player for his own fantasy team or perhaps that the expert had placed money on the outcome of a fantasy league game or real world game. Advantageously, position disclosures provide important information about the level of commitment an expert has to the opinion (i.e., whether the expert has a horse in the race).

Once the opinion and position disclosures have been extracted by the opinion extraction module 100, they are inserted into a structured model that also includes the name of the expert and other information and data related to the domain within which the prediction is being made. For example, information relevant to the consumer products market segment may be included in a structured model for an opinion related to the Apple stock. Other types of domain information can include information related to sector, industry, earnings figures, as well as technical information such as price trends or the performance of related indices. In an alternative embodiment where the domain is fantasy sports leagues, relevant domain information can include player and team statistics, team records, injury reports, probable starters, and the like. The structured model, including the author, the opinion, any positions and relevant domain information is then stored in the data storage area 25 for later use.

The decision model module 110 is periodically and independently used by the prediction server 20 to determine a decision model for each expert that is later used for outcome prediction based on the previous history of each expert contained within the system. The decision model module 110 uses a plurality of previous opinions for an expert, each of which were issued far enough in the past that the outcomes of the expert's forecasts are known. Otherwise stated, the outcome that is relevant to the prediction that was made by the expert is known. These plurality of prior predictions and known outcomes are used by the decision model module 110 to construct a decision model for an expert that can be applied to current predictions from that same expert. Advantageously, the plurality of prior predictions (processed into and stored in data storage area 25 as a plurality of structured models) provide attributes and labeled classifications suitable for input to a wide range of decision models. In one embodiment, the decision model module 110 creates a decision model that is in the form of a decision tree, for example using the CART algorithm, and in ensembles for voted classification using the bagging algorithm.

Once the decision model module 110 has constructed a decision model for an expert, the model for that expert is stored in the data storage area 25 and is thereafter available for use by the prediction module 120. In one embodiment, when a decision model in the form of a decision tree is created using the CART algorithm, the resulting tree is a binary decision tree rooted at a single binary decision node where each decision node has two children. Each of these two children nodes is either another decision node or a leaf node, where leaves are predicted outcomes for the subject for which the tree was built. A binary decision tree (and therefore a decision model) can vary from having a single root decision node with two leaves, to having dozens or more decision nodes with hundreds or thousands of terminal leaves. The size of a decision model depends on its complexity and the available amount of input used to create the decision model.

In order for predictions to be made using a decision model, a new opinion must be obtained. A new opinion may be obtained by the prediction server 20 by proactively crawling a website or downloading articles from a source server or other repository. Articles or other bodies of text may also be periodically transferred to data storage at the prediction server 20 where they are obtained by the prediction module 120. Alternatively, a new opinion may be obtain passively, for example by receiving an article or other body of text from a user (e.g., via the user interface 130). In one embodiment a user may request an evaluation of an expert opinion and provide a location of the expert opinion and the prediction server 20 proactively obtains the expert opinion using the provided location.

In one example embodiment, the user interface 130 allows a user to select an article from among a collection of articles containing opinions or alternatively provide the location (e.g., a URL) of an article containing an opinion. In another example embodiment, an automated trading system proactively collects articles from across the web, corporate network, and shared storage and provides the articles to the prediction server 20 to facilitate management of a portfolio by implementing the trading recommendations that the prediction module 120 determines to have the highest likelihood of satisfying a set of predetermined goals in consideration of a set of predetermined constraints. In an embodiment where the financial market is the domain, trading recommendations can be determined by the prediction module 120 from a finite set of options (e.g., buy, sell, and short).

The prediction module 120 receives an article to be evaluated and checks the data storage area 25 to see if the article has already been processed by the prediction server 20. For example, if a structured model for the article already is stored in the data storage area 25, then the article has already been processed. If the article is new, the prediction module 120 passes the article to the opinion extraction module 100 for processing. After the article is processed and has a corresponding structured model, the prediction module 120 obtains from the data storage area 25 the decision model constructed for the expert who authored the article. The decision module is then applied to the predictions made in the article to determine whether the expert's prediction in the article is likely to be correct or likely to be wrong. In one embodiment, the prediction module 120 may determine that there is insufficient information to judge the prediction. As previously discussed, a decision model may include a single decision tree or it may include a plurality of decision trees that, for example, vote using a product-of-experts algorithm.

In one embodiment, where there are a plurality of expert opinions related to a target subject, the prediction server 20 may analyze each of the plurality of expert opinions and employ an expert switching model to determine the most robust recommendation based on the analysis of the multiple expert opinions, which may be in agreement or may conflict, or both. For example, when a single target subject (e.g., a single stock) has multiple experts write articles and some experts predict the stock with go up and other experts predict that the stock will go down, after analyzing all of the articles to arrive at a plurality of recommendations (one for each expert), the prediction server 20 may evaluate the relative weight of the recommendations to arrive at a single best recommendation. Advantageously, that recommendation may be related to an expert opinion that the recommendation disagrees with or agrees with.

The user interface 130 operates in combination with a display device (not shown) to present information to a user and also facilitates receipt of information including bodies of text (e.g., natural language documents), for example by receiving information input by a user such as a network address for a body of text or by receiving a body of text directly from a user via the user interface 130.

Figure 3:
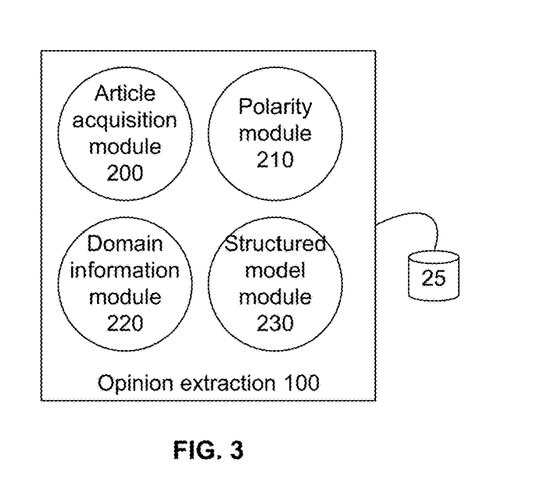
FIG. 3 is a block diagram illustrating an example opinion extraction module according to an embodiment of the present invention.

FIG. 3 is a block diagram illustrating an example opinion extraction module 100 according to an embodiment of the present invention. In the illustrated embodiment, the opinion extraction module 100 comprises an article acquisition module 200, a polarity module 210, a domain information module 220, and a structured model module 230. The opinion extraction module 100 accesses and stores data in the data storage area 25.

The article acquisition module 200 operates to proactively or passively obtain a body of text such as a natural language article written by an expert. In one embodiment, the article acquisition module 200 may consult a list of network addressable sources such as uniform resource identifiers ("URIs") and uniform resource locators ("URLs") and periodically access those sources via a data communication network and proactively obtain one or more bodies of text. Alternatively, the article acquisition module 200 may receive a body of text via a communication interface device for example by receiving a document via a user interface or by receiving an address or location of a body of text via a user interface. Bodies of text may also be received via a communication interface such that they are periodically sent to the prediction server 20 and routed via a communication interface device to the article acquisition module 200. In one embodiment, the article acquisition module 200 may determine the name of the expert who authored the article.

The polarity module 210 parses the body of text to identify all opinions and positions that are included in the body of text. In a simple case, a body of text has only one reference (i.e., a mention of a possible subject of an opinion) and only one opinion. However, in more complicated cases, a body of text may have multiple references, express multiple opinions, include quotations from non-authors, and even have multiple authors. The polarity module 210 is capable of parsing a body of text to identify all opinions and positions in each of these scenarios.

For example, in a body of text with only one reference, the polarity module 210 parses the text and may determine that there is no opinion expressed, that there is a single opinion expressed, or that there are multiple opinions expressed. Alternatively, in a body of text with multiple references, the polarity module 210 parses the text and may determine that there is no opinion expressed, that there is a single opinion expressed for a single reference, or that there are multiple opinions expressed for multiple references and all combinations of the above.

In one embodiment, if there are multiple instances of a reference in the body of text, the polarity module 210 reconciles the context surrounding each of the instances into a single opinion for that reference in the body of text. The polarity module 210 may do the same reconciliation for multiple references identified in a single body of text so that the result is that multiple opinions, one for each reference, are derived from the body of text.

In a more complicated embodiment, a single reference may have more than one opinion expressed about it in the body of text. For example, the body of text may include multiple instances of the reference Joe Montana and express an opinion that Joe will throw three touchdown passes and also express an opinion that Joe will throw two interceptions. In a fantasy football league domain, each of these opinions is separately desirable to derive from the body of text and the polarity module operates to do so.

The polarity module 210 additionally identifies any positions that are expressed in the body of text. A position is any information related to an expert's level of commitment to the opinion, for example a statement about an expert's potential gains from disclosing the opinion, such as ownership or shorting of a stock which has been positively discussed, or a bet placed on or against a horse predicted to win a race.

In one embodiment, the polarity module 210 uses a named entity recognizer to identify persons, places, companies, or other items included in the body of text that may be the subject of an opinion in the body of text. These identified named entities are the references in the body of text and once identified they are stored in memory for further processing. The polarity module 210 then determines the context surrounding around each instance of each reference in the body of text and scores that context against previous examples of opinions in the same domain. The highest score for polarity of opinion at each reference is assigned as the polarity of the opinion for the given reference. Once the polarity has been computed for all instances of a reference in the article, the aggregate opinion polarity for that reference is determined. For example, the aggregate opinion polarity may be determined by a voting process that considers all of the references in the article. This process serves to reconcile the presence of multiple instances of a reference into a single opinion for the reference in the body of text. The polarity module 210 performs the same reconciliation for each reference in the body of text, which ultimately may result in no opinion, a single opinion for a single reference, or multiple opinions (one opinion for each of a plurality of references).

In a more complicated embodiment, when the context of the reference is analyzed, the polarity module 210 may determine that there are separate opinions expressed in the body of text for a single reference (e.g., Joe will throw three touchdowns and Joe will throw two interceptions). In this case, there are multiple opinions for a single reference, and the polarities are separately calculated for the separate opinions and the aggregate polarity for the first opinion for the reference is determined and the aggregate polarity for the second opinion for the reference is determined and so forth until each of the multiple opinions for the reference have been analyzed and scored (and aggregated where there are multiple instances for a reference-opinion combination).

The polarity module 210 also operates to handle a body of text that has multiple authors. In this case, the polarity module processes the body of text in cooperation with the structured model module 230 such that each expert who is an author of the body of text has a structured model created for the body of text.

The polarity module 210 also operates to handle quotations that express an opinion in a body of text when the quotations are attributed to non-authors. In this case, the polarity module processes the body of text in cooperation with the structured model module 230 such that quotations attributes to a non-author are treated as separate bodies of text and therefore a separate structured model is created for the quotation alone if the quotation expresses an opinion.

The domain information module 220 assembles current information about a given domain for inclusion in a structured model. A domain may be an industry, a market sector, a professional sports team or league, or any other identifiable group about which an expert may express an opinion. An expert may also express an opinion about a component of an identifiable group. For example, the domain (e.g., identifiable group) may be the technology industry sector and a target subject of an expert opinion (a component of that group) may be the Intel Corporation stock. In that example, domain information module 220 assembles current information about the technology industry sector. More specific domain information, e.g., information only about the Intel stock, may also be assembled and used.

The domain information module 220 stores domain information in the data storage area 25 and operates in connection with the polarity module 210 and the structured model module 230 to facilitate inclusion in a structured model relevant domain information that is related to the target subject about which an opinion has been expressed in a body of text.

The structured model module 230 operates in connection with the article acquisition module 200, the polarity module 210 and the domain information module 220 to create a structured model for a body of text. The structured model includes a name of the expert who authored the article (which may be provided by the article acquisition module 200 or the polarity module 210), opinion information from the polarity module 210, and domain information from the domain information module 220. The structured model may also include position information from the polarity module 210 if available. The structured model module 230 stores the resulting structured model in the data storage area 25.

In one embodiment, the structured model module 230 may use an XML format to organize the information and data contained in a structured model. A variety of schema may be employed for such organization as will be understood by those skilled in the art.

The size of a structured model will vary depending on the number of attributes included. For example, a structured model in the financial market domain might include the following attributes: pick-id, fivedaydjiatrend, fivedaynasdaqtrend, fivedaysp500trend, fivedaysectortrend, fivedaytrend, pick_date, position, rating, sixtydaydjiatrend, sixtydaynasdaqtrend, sixtydaysp500trend, sixtydaysectortrend, sixtydaytrend, tendaydjiatrend, tendaynasdaqtrend, tendaysp500trend, tendaysectortrend, tendaytrend, twentydaydjiatrend, twentydaynasdaqtrend, twentydaysp500trend, twentydaysectortrend, twentydaytrend, analyst_id, company_id, and article_id. In one embodiment, the analyst_id, company_id, and article_id attributes are indices into additional data structures (e.g., tables stored in the data storage area) that contain identifying information for the analyst, the target company (including things like sector and industry), and the article text annotated for search. An XML representation of an example structured model might look like the following, where the ellipses indicate missing attributes that are left out for simplicity of presentation:

```
<pick id="1111" analyst_id="42" company_id="21" article_id="152">
    ...
    <attribute name="fivedaytrend" type="double" value=""/>
    <attribute name="pick_date" type="timestamp"
    value="01/01/2006:12:00:00EDT"/>
    <attribute name="position" type="string" value="LONG"/>
    <attribute name="rating" type="string" value="BULLISH"/>
    ...
</pick>
```

Figure 4:
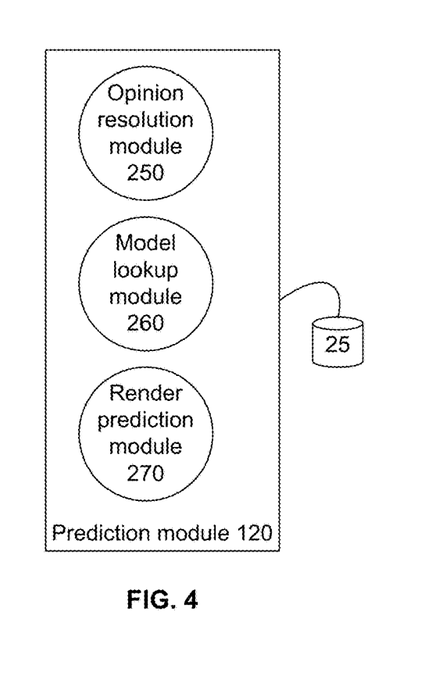
FIG. 4 is a block diagram illustrating an example prediction module according to an embodiment of the present invention.

FIG. 4 is a block diagram illustrating an example prediction module 120 according to an embodiment of the present invention. In the illustrated embodiment, the prediction module 120 comprises an opinion resolution module 250, a module lookup module 260 and a render prediction module 270. The prediction module 120 accesses and stores data in the data storage area 25 when operating to render a prediction. In one embodiment, the prediction module operates in connection with the user interface 130 of the prediction server 20 to receive an indication about the body of text about which to render a prediction or otherwise provide a recommendation.

The opinion resolution module 250 determines the body of text about which to render a prediction or provide a recommendation. For example, the opinion resolution module 250 may receive a body of text from the user interface 130 and determine if that body of text has previously been analyzed by the system. If it has, then the corresponding structured module has already been created. If the body of text has not yet been analyzed by the system, then the opinion resolution module 250 processes the body of text to create a structured model for the opinion. For example, the opinion resolution module provides the body of text to the previously described opinion extraction module 100. Once the body of text has been analyzed and the structured model created or obtained from data storage 25, the prediction server 20 may also recreate the decision model for the expert who authored the opinion, if appropriate. In one embodiment, the prediction server 20 includes a set of criteria that determine when a new or revised decision model is created for an expert.

Once the opinion resolution module 250 has determined the expert who authored of the body of the text and a structured model for the body of text has been created by the prediction server 20 or confirmed to reside in data storage 25, the expert name is provided to the model lookup module 260. The model lookup module 260 then obtains the decision model for the identified expert from data storage 25. If there is no existing decision model for the expert, the model lookup module 260 may provide the name of the expert to the decision model module 110 and request that a decision model be created. If there is insufficient data for the decision model module 110 to create decision model, the model lookup module 260 may pass an error message to the user, for example, via the prediction module 120 and the user interface 130.

When a decision model for the expert does exist, it is fetched from data storage 25 by the model lookup module 260 and the render prediction model 270 then processes the structured model for the body of text in accordance with the decision model for the expert. When the structured model for the body of text is processed, any opinions and positions in the structured model are analyzed in accordance with the decision model. In one embodiment, the result of the render prediction module 270 processing of the structured model for the body of text in accordance with the decision model for the expert is a prediction about the accuracy of the opinion expressed by the expert in the body of text. For example, a prediction about the accuracy of the opinion can be based on the likelihood that the opinion will be correct with respect to the target subject. Alternatively, or in addition, the result of the prediction module 270 processing may also be a recommendation of an action to be taken. For example, actions to be taken may be in accordance with the opinion expressed in the body of text, it may be contrary to the opinion expressed in the body of text, or it may be neutral with respect to the opinion. Advantageously, recommended actions may be selected from a plurality of possible recommended actions based on the likelihood that the recommended action will be profitable (in a financial market domain), will maximize scoring (in a fantasy sports league domain), will advance political goals (in a political domain), etc.

Figure 5:
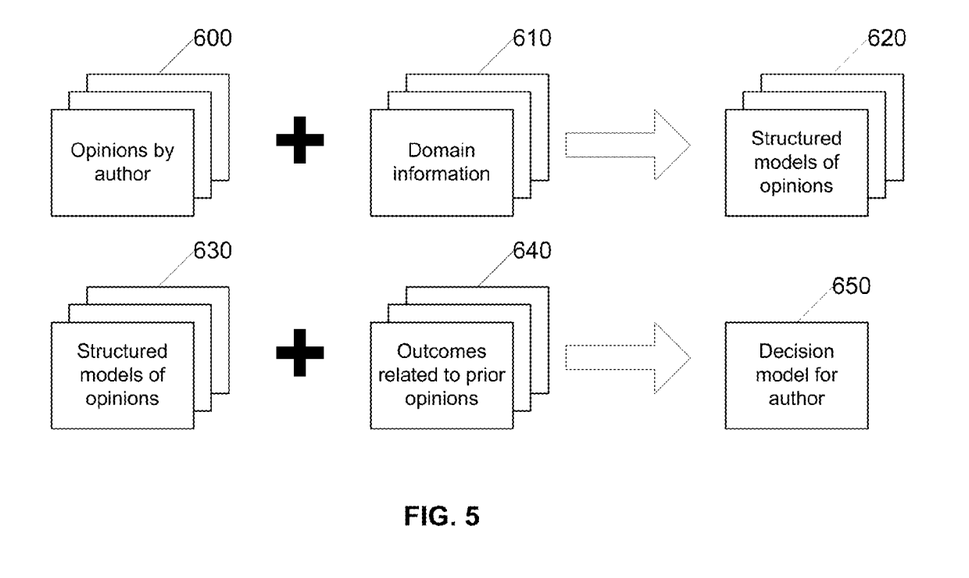
FIG. 5 is a flow diagram illustrating an example process for creating structured models of expert opinions and creating a decision model for an expert according to an embodiment of the present invention.

FIG. 5 is a flow diagram illustrating an example process for creating structured models of expert opinions and creating a decision model for an expert according to an embodiment of the present invention. In one embodiment, the illustrated process can be carried out by the previously described prediction server 20. Initially, a plurality of opinions 600 by an expert are analyzed by the prediction server 20 and the resulting information from each opinion is combined with domain information 610 that is relevant to the subject matter of the opinion to create a structured model 620 of each opinion by the expert. A plurality of structured models 630 are then combined with information about the actual outcomes 640 related to the opinion expressed in the opinion by the expert (e.g., was the expert's opinion/prediction correct or incorrect) and the combined structured models 630 and outcome information 640 is compiled into a decision model 650 for the expert. The decision model 650 can later be used to analyze a body of text produced by the expert to determine if the opinions expressed by the expert in that body of text are likely to be correct, incorrect or neutral. The decision model can also be used to recommend certain actions based on the determined likelihood of the opinion to be correct, incorrect or neutral. More granular strata of likelihoods may also be used.

Figure 6:
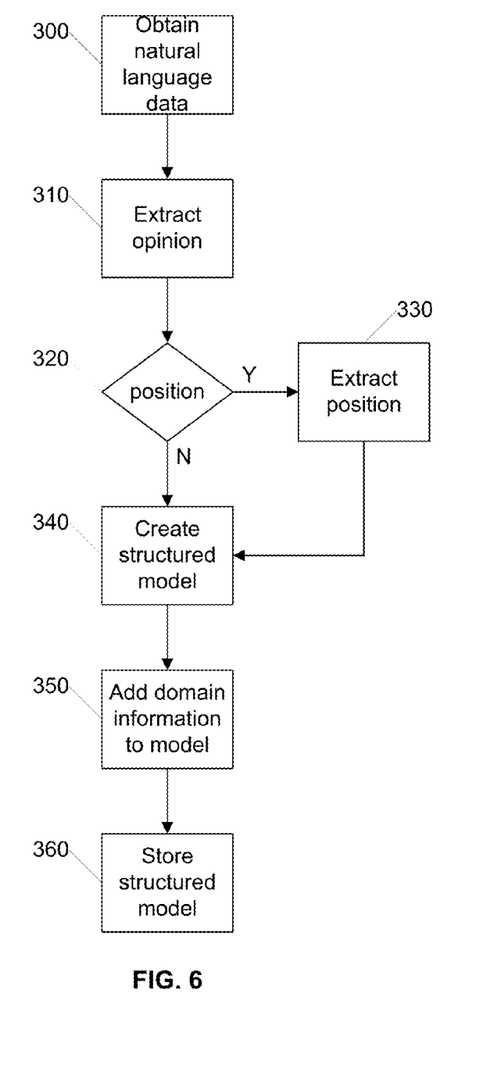
FIG. 6 is a flow diagram illustrating an example process for creating and storing a structured model of an opinion according to an embodiment of the present invention.

FIG. 6 is a flow diagram illustrating an example process for creating and storing a structured model of an opinion according to an embodiment of the present invention. In one embodiment, the illustrated process can be carried out by the previously described prediction server 20. Initially, in step 300 the prediction server obtains a body of text as a natural language document. The natural language document can be proactively obtained or passively obtained as previously explained. For example, the natural language document may be proactively obtained by accessing external repositories such as websites, FTP servers, libraries, databases, and the like. Such accessing may include dynamically crawling websites or accessing network accessible document repositories by carrying out computer executable instructions stored, for example as a script in a data storage area. The natural language document may be passively obtained through internal document repositories or by files being uploaded into a data storage area to which the prediction server has access.

Next, in step 310 an opinion is extracted from the natural language document. An opinion may include one or more position statements, as determined in step 320. If position statements are present, they are extracted in step 330 and then the opinion and position statements (if any) are compiled into a structured model, as shown in step 340. Next, in step 350, domain information (which is relevant information related to the subject matter of the opinion expressed in the natural language document at the time the opinion was rendered) is added to the structured model. The combined opinion, positions, and domain information is then stored in a data storage area as a structured model for the opinion expressed in the natural language document, as shown in step 360.

In one embodiment, the structured model conforms to a schema that is specific to the domain for which the opinion is expressed. For example, if the opinion is about technology stocks, the structured model may conform to a schema that is specific to the technology sector. Similarly, if the opinion is about a professional sports team, the structured model may conform to a schema that is specific to professional baseball, basketball, or other professional sport (i.e., the domain). A schema may advantageously be very specifically tailored to a narrow domain or may be broadly tailored to a broad domain.

Figure 7:
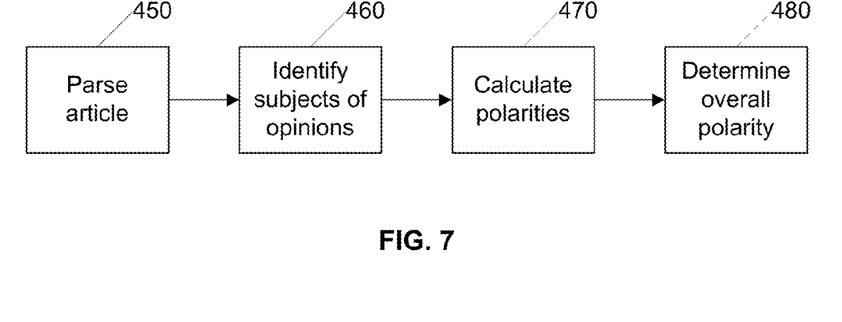
FIG. 7 is a flow diagram illustrating an example process for extracting an opinion from a natural language document and determining an overall polarity for the opinion according to an embodiment of the present invention.

FIG. 7 is a flow diagram illustrating an example process for extracting an opinion from a natural language document and determining an overall polarity for the opinion according to an embodiment of the present invention. In one embodiment, the illustrated process can be carried out by the previously described prediction server 20. Initially, in step 450 a body of text (e.g., a natural language document such as an article) is parsed and possible subjects of the opinion are identified in step 460. For example, the parsing process operates to identify named entities in the body of text. Named entities can include persons, places, companies, or other items which may be the subject of the opinion such as a stock symbol, a sports team, a specific game (e.g., super bowl), or other entity or item.

The various named entities or items that are identified as possible subjects of the opinion in the body of text are then analyzed. In step 470, the one or more contexts of each identified possible subject of the opinion are analyzed and a polarity score is determined for each instance of each possible subject of the opinion. Polarity scores can, for example, range between very positive, positive, neutral, negative and very negative. More granular strata may also be used. In one embodiment, polarity scores are determined in accordance with previous opinions, where the subjects of those previous opinions are in the same domain as the current opinions being analyzed. In one embodiment, the highest polarity score of all instances of each possible subject of the opinion is used as the polarity score for that possible subject of the opinion.

Finally, in step 480 the subject matter of the opinion and the overall polarity is determined based on the relative polarity scores of the identified possible subjects of the opinion. In one embodiment, this is calculated by taking a vote over each possible subject of the opinion to determine a single opinion for the article and the aggregate polarity for the article.

Figure 8:
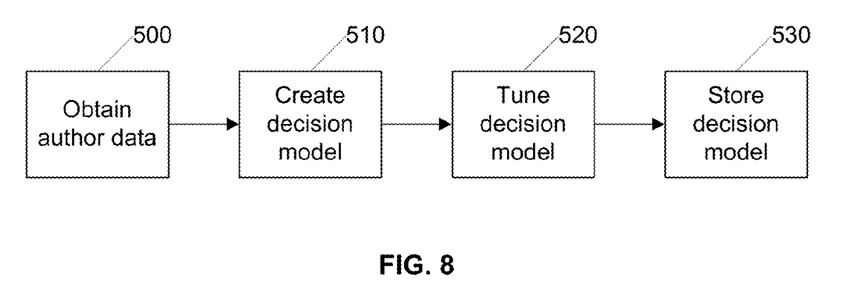
FIG. 8 is a flow diagram illustrating an example process for creating and storing a decision model for an expert according to an embodiment of the present invention.

FIG. 8 is a flow diagram illustrating an example process for creating and storing a decision model for an expert according to an embodiment of the present invention. In one embodiment, the illustrated process can be carried out by the previously described prediction server 20 and may take place asynchronously with the other aspects of the operation of the prediction server 20. It should be noted that the process for creating and storing a decision model may be initiated by a number of means including direct instruction, the presence of a predetermined number of structured models for an expert, the arrival of a predetermined time or elapsing of a predetermined interval or other temporal consideration, or the receipt of new data, just to name a few.

Initially, in step 500 data regarding and expert is obtained. In one embodiment, expert data includes a plurality of structured models for opinions that were expressed by the expert, for example, expressed in natural language documents or other media (e.g., audio) that were converted to natural language and processed into a separate structured models for each opinion. The structured models may be obtained from a data storage area that is accessible by the prediction server or that is integral with the prediction server. In one embodiment, the only structured models that are obtained are those for which an outcome related to the opinion expressed by the expert is known. Next, in step 510 the plurality of structured models and the outcome data for the opinions expressed in those structured models are compiled into a decision model for the expert. Advantageously, in step 520 the decision model for the expert is tuned to provide optimal accuracy. In one embodiment, the tuning of a decision model includes creating two or more candidate models and running one or more simulations using the known structured models and outcome information to identify the decision model that most accurately predicts the known outcome for each of the structured models for the expert. The tuned decision model is then stored in a data storage area as shown in step 530. The decision model can be stored as a file in a file system, as a single record or plurality of records in a database, or in some other data structure, as will be understood by those having skill in the art.

Figure 9:
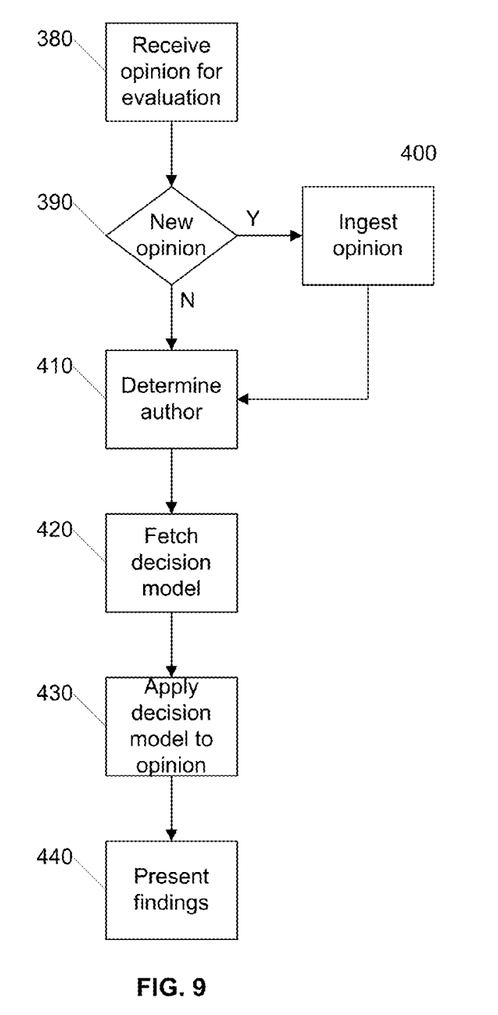
FIG. 9 is a flow diagram illustrating an example process for analyzing and predicting an outcome of expert forecasts according to an embodiment of the present invention.

FIG. 9 is a flow diagram illustrating an example process for analyzing and predicting an outcome of expert forecasts according to an embodiment of the present invention. In one embodiment, the illustrated process can be carried out by the previously described prediction server 20. Initially, in step 380 a body of text including an opinion is received for evaluation. The body of text may be a natural language document and may be received, for example, via a user interface or via a periodic process that fetches bodies of text from a predetermined location on a network or in memory. Alternative ways to receive or obtain an opinion for evaluation may also be employed.

Next, in step 390, the body of text is analyzed to determine if it is a new opinion for the prediction server or if it has been previously analyzed by the prediction server. If it is a new opinion, then in step 400 the body of text is analyzed to create a structured model, for example as previously described with respect to FIG. 6. If it is not a new opinion, or after the new opinion has been ingested, in step 410 the expert who authored the opinion is determined and then in step 420 the decision model for that expert is fetched. For example, the decision model may be obtained from persistent or volatile data storage of the prediction server.

Once the decision model for the expert has been fetched, in step 430 the decision model is applied to the opinion expressed in the body of text that was received in step 380. In one embodiment, application of a decision model to the opinion expressed in a body of text includes analyzing the domain information and prior record of the expert with respect to making accurate predictions (e.g., expressing opinions/forecasts that turn out to be correct) about the target subject of the opinion in its specific domain. For example, if the expert has a track record of correctly forecasting the rise or fall of the stock price of a particular company in the technology sector, then the decision model will reflect that track record and a new opinion from that expert about the stock price of that particular company will be analyzed accordingly. However, if the expert also has a track record of incorrectly forecasting the rise or fall of all stock prices in the technology sector during the first quarter of a given year, and the new opinion from the expert is about the particular company in the technology section and also about the company's stock price in the first quarter, then the decision model will also reflect that track record and the new opinion will be analyzed accordingly.

In one embodiment, a decision model comprises a binary decision tree that is constructed such that one branch of a decision node always represents a positive attribute value evaluation while the other branch of that decision node always represents a negative evaluation. For known items, (e.g., rating, position, business sectors, etc.) a specific value is chosen and the positive evaluation at the decision node is achieved by an exact match to the specific value. In one embodiment, for discrete values (e.g., numeric values) a positive evaluation is achieved by a result of greater than or equal to the value at the node. When a new opinion is evaluated the system begins at the root node of the decision model and examines the value of the attribute in the structured model for the root node and based upon that evaluation the appropriate branch is taken. This process is then repeated at successive decision nodes until a leaf node is reached and the corresponding predicted outcome is returned. In an embodiment where a decision node is encountered for which the structured model of the opinion has no available attribute value, both branches are taken and the final results of analyzing both branches (or a plurality of branches in some cases) are appropriately weighted and combined to form a final prediction.

Finally, in step 440 the results of the application of the decision model to the opinion are presented. For example, the results may be presented on the display of a user interface device. Alternatively, the results may be printed on paper and published or sent to an entity or person that requested the results. Advantageously, the results may include information regarding the predicted accuracy of the opinion expressed by the expert in the body of text and may also include information regarding suggested actions to be taken based on the predicted accuracy. In one embodiment, the expert who authored the opinion may have a track record for being incorrect in opinions about the stock price of a particular company in the technology sector. Accordingly, if a new opinion expressed by the expert is that the stock price will fall and the results of the application of the decision model to the new opinion is that the expert's prediction has a very high likelihood of being incorrect, the prediction server may suggest purchasing the stock of that particular company in the technology sector because the result of the expert's incorrect prediction is likely to be that the stock price goes up.

Figure 10:
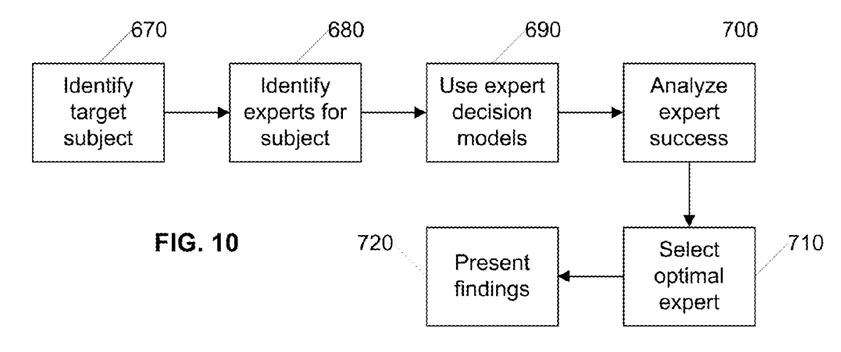
FIG. 10 is a flow diagram illustrating an example process for determining an optimal expert related to a target subject and analyzing and predicting an outcome of the optimal expert's forecast for the target subject according to an embodiment of the present invention.

FIG. 10 is a flow diagram illustrating an example process for determining an optimal expert related to a target subject and analyzing and predicting an outcome of the optimal expert's forecast for the target subject according to an embodiment of the present invention. In one embodiment, the illustrated process can be carried out by the previously described prediction server 20. Initially, in step 670, a target subject is identified. Next, in step 680 a plurality of experts that have expressed opinions about the target subject are identified. Next, in step 690 the decision model for each selected expert is obtained and used to analyze one or more opinions about the target subject. In one embodiment, as the results of the analyses using various expert decision models are obtained, the reliability of each expert's analysis is calculated in step 700, for example using prior articles or bodies of text that are similar to the current target subject. The relative success of each identified expert from the analysis in step 700 is then used to select an optimal expert in step 710.

In one embodiment, the optimal expert is the expert with the highest relative success. Finally, in step 720 the results of the analysis and any suggested actions are presented as findings. Presentation of the findings can be on the display of a user interface device or in an alternative medium such as a newspaper, magazine, whitepaper or analysis report.

Figure 11:
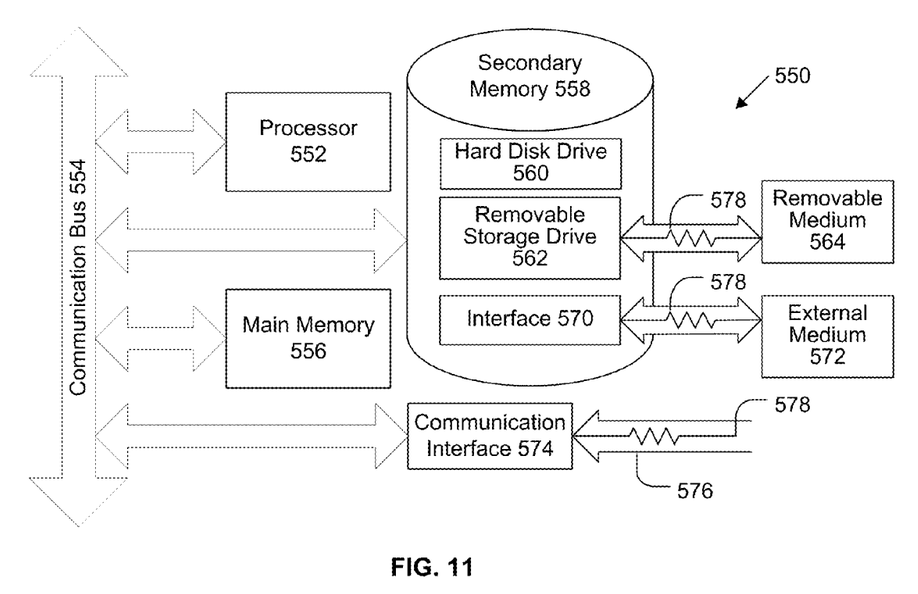
FIG. 11 is a block diagram illustrating an example prediction system that may be used in connection with various embodiments described herein.

FIG. 11 is a block diagram illustrating an example prediction system 550 that may be used in connection with various embodiments described herein. In the illustrated embodiment, the prediction system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the prediction system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Prediction system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the prediction system 550 as electrical communication signals 578.

In alternative embodiments, secondary memory 558 may include other similar means for allowing computer programs or other data or instructions to be loaded into the prediction system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the prediction system 550.

Prediction system 550 may also include a communication interface device 574. The communication interface device 574 allows software and data to be transferred between prediction system 550 and external devices (e.g. printers), networks, or information sources. For example, computer software, executable code and/or bodies of text may be obtained by prediction system 550 from a network server via communication interface device 574. Examples of communication interface device 574 include a modem, a network interface card ("NIC"), a communications port, a PCMCIA slot and card, an infrared interface, and an IEEE 1394 fire-wire, just to name a few.

Communication interface device 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface device 574 are generally in the form of electrical communication signals 578. These signals 578 are preferably provided to communication interface device 574 via a communication channel 576. Communication channel 576 carries signals 578 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 556 and/or the secondary memory 558. Computer programs can also be received via communication interface device 574 and stored in the main memory 556 and/or the secondary memory 558. Such computer programs, when executed, enable the prediction system 550 to perform the various functions of the present invention as previously described.

In this description, the term "computer readable medium" is used to refer to any media used to provide computer executable code (e.g., software and computer programs) and data to the prediction system 550. Examples of these media include main memory 556, secondary memory 558 (including hard disk drive 560, removable storage medium 564, and external storage medium 572), and any peripheral device communicatively coupled with communication interface device 574 (including a network information server or other network device). These computer readable mediums are means for providing executable code, programming instructions, and software to the prediction system 550.

In an embodiment that is implemented at least partially using software, the software may be stored on a computer readable medium and loaded into prediction system 550 by way of removable storage drive 562, interface 570, or communication interface device 574. In such an embodiment, the software is loaded into the prediction system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the described grouping of functions within a module, block, or step is for ease of description. Specific functions or steps can be moved from one module, block or step to another without departing from the invention.

Moreover, the various illustrative logical blocks, modules, and methods described in connection with the embodiments disclosed herein can alternatively be implemented or performed with a system that includes a central processing unit, a digital signal processor ("DSP"), an ASIC, FPGA or other programmable logic device, discrete gate or transistor logic, discrete hardware components, or any combination thereof designed to perform the functions described herein. A central processing unit can be a microprocessor, but in the alternative, the central processing unit can be any processor, controller, microcontroller, or state machine. A processor can also be implemented as a combination of computing devices, for example, a combination of a DSP and a microprocessor, a plurality of microprocessors, one or more microprocessors in conjunction with a DSP core, a multi-core processor, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, or in combination, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A technical system for determining the accuracy of expert forecasts embodied in a target natural language document, the system comprising:
   a data storage area attached to a prediction server, wherein the data storage area stores a plurality of structured models and decision models;
   a communication interface device that receives information from a data communication network, said information including natural language documents;
   an opinion extraction module that
      receives a natural language document comprising an opinion,
      parses the words in said natural language document,
      identifies an expert who authored the natural language document,
      identifies a named entity in the natural language document,
      determines a polarity for each reference to the named entity in the natural language document,
      aggregates each determined polarity into a single aggregate polarity for the named entity utilizing a voting process,
      determines an opinion based on the aggregate polarity,
      creates a structured model of said natural language document, wherein the structured model identifies the expert and the named entity and includes said opinion, and
      stores the structured model in the data storage area;
   a decision model module that
      obtains a plurality of structured models for an expert,
      obtains a plurality of outcomes for the opinions of the plurality of structured models,
      processes the plurality of structured models and the plurality of outcomes to produce a decision model for said expert, and
      stores said decision model in the data storage area; and
   a prediction module that
      receives a target natural language document,
      identifies a target expert who authored the target natural language document,
      extracts a target opinion from the target natural language document,
      obtains a decision model for said identified target expert from the data storage area based on a lookup of said identified target expert, and
      applies the obtained decision model to the target opinion to generate a prediction of the accuracy of the target opinion.

2. The system of claim 1, wherein the opinion extraction module is further configured to parse the words in a natural language document and extract one or more positions.

3. The system of claim 1, wherein the prediction module obtains a structured model for the target natural language document from the data storage area.

4. The system of claim 1, wherein the prediction module obtains a structured model for the target natural language document from the opinion extraction module.

5. The system of claim 1, wherein the opinion extraction model includes domain information in the structured model.

6. The system of claim 1, wherein the prediction module determines a recommended action in accordance with the prediction of the accuracy of the target opinion.

7. The system of claim 6, wherein the recommended action is selected from a plurality of recommended actions.

8. The system of claim 7, wherein the selected recommended action is selected based on a likelihood of the recommended action being profitable.

9. The system of claim 1, wherein the opinion extraction module:
   identifies a plurality of named entities in the natural language document;
   determines a polarity for each reference to any of the identified plurality of named entities in the natural language document; and,
   for each of the identified plurality of named entities,
      aggregates each determined polarity for each reference to the named entity into a single aggregate polarity for the named entity utilizing a voting process, and
      determines an opinion based on the aggregate polarity.

10. A non-transitory computer readable medium having stored thereon one or more sequences of instructions for causing one or more microprocessors to perform the steps for determining the accuracy of expert forecasts embodied in a target natural language document, the steps comprising:
   by an opinion extraction module,
      receiving a natural language document comprising an opinion,
      parsing the words in said natural language document,
      identifying an expert who authored the natural language document,
      identifying a named entity in the natural language document,
      determining a polarity for each reference to the named entity in the natural language document,
      aggregating each determined polarity into a single aggregate polarity for the named entity utilizing a voting process,
      determining an opinion based on the aggregate polarity,
      creating a structured model of said natural language document, wherein the structured model identifies the expert and the named entity and includes said opinion, and
      storing the structured model in a data storage area;
   by a decision model module,
      obtaining a plurality of structured models for an expert,
      obtaining a plurality of outcomes for the opinions of the plurality of structured models,
      processing the plurality of structured models and the plurality of outcomes to produce a decision model for said expert, and
      storing said decision model in the data storage area; and,
   by a prediction module,
      obtaining a target natural language document as a body of text in electronic form,
      determining an expert who authored the target natural language document,
      obtaining from the data storage area a decision model for said expert who authored the natural language document based on a lookup of said expert who authored the natural language document;
      extracting a target opinion from the target natural language document,
      obtaining a structured model for said target natural language document, wherein the structured model identifies said target opinion of said expert who authored the natural language document and domain information related to the subject of said target opinion;
      analyzing the structured model for said target natural language document in accordance with said decision model for said expert who authored the natural language document; and
      determining a prediction of the accuracy of the opinion identified in said structured model for the target natural language document based on said analysis.

11. The non-transitory computer readable medium of claim 10, wherein the steps further comprise determining a recommended action in accordance with the predicted accuracy of the opinion.

12. The non-transitory computer readable medium of claim 11, wherein the steps for determining a recommended action further comprise selecting a recommended action from a plurality of conflicting recommended actions.

13. The non-transitory computer readable medium of claim 12, wherein the steps for selecting a recommended action from a plurality of conflicting recommended actions further comprise selecting a recommended action based on a likelihood of the recommended action being profitable.

14. The non-transitory computer readable medium of claim 10, wherein extracting the target opinion from the target natural language document comprises:
   parsing the text of the target natural language document to identify a plurality of references, wherein each reference represents a possible subject of an opinion;
   determining a context of the text surrounding each instance of each of the plurality of references in the target natural language document;
   determining a polarity for each instance of each reference based on the determined context;
   determining an aggregate polarity for each of the plurality of references based on the polarity for each instance of a reference;
   identifying at least one reference in the plurality of references as the subject of an opinion in the target natural language document based on the aggregate polarity of the reference; and
   identifying at least one opinion in the target natural language document based on the polarity of the reference identified as the subject of the opinion.

15. A method for determining the accuracy of expert forecasts embodied in a target natural language document and providing a recommended action, the method implemented by a prediction server having a data storage area, a processor, and a network interface device that communicatively connects the prediction server to a data network, the method comprising:
   receiving a natural language document comprising an opinion;
   parsing the words in said natural language document;
   identifying an expert who authored the natural language document;
   identifying a named entity in the natural language document;
   determining a polarity for each reference to the named entity in the natural language document;

aggregating each determined polarity into a single aggregate polarity for the named entity utilizing a voting process;
determining an opinion based on the aggregate polarity;
creating a structured model of said natural language document, wherein the structured model identifies the expert and the named entity and includes said opinion;
storing the structured model in a data storage area;
obtaining a plurality of structured models for an expert;
obtaining a plurality of outcomes for the opinions of the plurality of structured models;
processing the plurality of structured models and the plurality of outcomes to produce a decision model for said expert;
storing said decision model in the data storage area;
obtaining via the network interface device a target natural language document as a body of text in electronic form and storing the target natural language document in the data storage area;
analyzing the target natural language document to determine a target expert who authored the target natural language document;
obtaining from the data storage area a decision model for said target expert;
extracting a target opinion from the target natural language document;
obtaining a structured model for said target natural language document, wherein the structured model identifies said target opinion of said target expert, said target opinion derived from the target natural language documentand domain information related to the subject of said target opinion;
analyzing the structured model for said target natural language document in accordance with said decision model for said target expert;
determining a prediction of the accuracy of the opinion identified in said structured model for the target natural language document in accordance with the analysis of the structured model in accordance with the decision model;
determining a recommended action based on the predicted accuracy of the opinion; and
presenting the recommended action on a display.

16. The method of claim 15, wherein determining a recommended action further comprises selecting a recommended action from a plurality of conflicting recommended actions.

17. The method of claim 16, wherein selecting a recommended action from a plurality of conflicting recommended actions further comprises selecting a recommended action based on a likelihood of the recommended action being profitable.

18. The method of claim 15, wherein extracting the target opinion from the target natural language document comprises:
parsing the text of the target natural language document to identify a plurality of references, wherein each reference represents a possible subject of an opinion;
determining a context of the text surrounding each instance of each of the plurality of references in the target natural language document;
determining a polarity for each instance of each reference based on the determined context;
determining an aggregate polarity for each of the plurality of references based on the polarity for each instance of a reference;
identifying at least one reference in the plurality of references as the subject of an opinion in the target natural language document based on the aggregate polarity of the reference; and
identifying at least one opinion in the target natural language document based on the polarity of the at least one reference identified as the subject of the opinion.

* * * * *